United States Patent
Carr et al.

(10) Patent No.: US 12,038,378 B2
(45) Date of Patent: Jul. 16, 2024

(54) SELF-CALIBRATING OPTICAL TURBIDITY MEASURING APPARATUS

(71) Applicant: ABB Schweiz AG, Baden (CH)

(72) Inventors: Benjamin Carr, Stroud (GB); Andrew James Bowen, Cam Dursley (GB)

(73) Assignee: ABB Schweiz AG, Baden (CH)

( * ) Notice: Subject to any disclaimer, the term of this patent is extended or adjusted under 35 U.S.C. 154(b) by 207 days.

(21) Appl. No.: 17/566,076

(22) Filed: Dec. 30, 2021

(65) Prior Publication Data

US 2022/0120679 A1 Apr. 21, 2022

Related U.S. Application Data

(63) Continuation of application No. PCT/EP2020/068055, filed on Jun. 26, 2020.

(30) Foreign Application Priority Data

Jul. 1, 2019 (EP) ..................................... 19183582

(51) Int. Cl.
  *G01N 21/51* (2006.01)
  *G01N 21/47* (2006.01)

(52) U.S. Cl.
  CPC ......... *G01N 21/51* (2013.01); *G01N 21/4785* (2013.01)

(58) Field of Classification Search
  CPC .... G01N 21/51; G01N 21/4785; G01N 21/49; G01N 21/03
  See application file for complete search history.

(56) References Cited

U.S. PATENT DOCUMENTS

| 3,234,846 A | * | 2/1966 | Cropper | G01N 21/532 356/442 |
| 3,713,743 A | * | 1/1973 | Simms | G01N 21/532 356/442 |

(Continued)

FOREIGN PATENT DOCUMENTS

| CN | 106102517 A | 11/2016 |
| CN | 108027171 A | 5/2018 |

(Continued)

OTHER PUBLICATIONS

European Patent Office, Extended European Search Report in European Patent Application No. 19183582.6, 7 pp. (Nov. 22, 2019).

(Continued)

*Primary Examiner* — Jonathan M Hansen
(74) *Attorney, Agent, or Firm* — Leydig, Voit & Mayer, Ltd.

(57) ABSTRACT

A system and method for self-calibrating optical turbidity measurements includes a housing comprising a cavity with an inner wall having an essentially straight section and an opening for the medium. An optical standard is moveable between first and second sections within the essentially straight section, and a light source and a light sensor, arranged at the first section and configured to measure the turbidity of the medium, when the optical standard is at the second section, and configured to measure the turbidity of the optical standard and to determine, as a function of the measured turbidity, a calibration coefficient for performing a self-calibration, when the optical standard is at the first section.

12 Claims, 3 Drawing Sheets

(56) References Cited

U.S. PATENT DOCUMENTS

| | | | | |
|---|---|---|---|---|
| 4,451,152 A | * | 5/1984 | Topol | G01N 21/11 |
| | | | | 356/440 |
| 5,467,187 A | * | 11/1995 | Beers | G01N 21/534 |
| | | | | 356/442 |
| 7,659,980 B1 | * | 2/2010 | Mitchell | G01N 21/53 |
| | | | | 356/338 |
| 8,927,922 B2 | | 1/2015 | Lawal et al. | |
| 2005/0117156 A1 | * | 6/2005 | Siepmann | G01N 21/31 |
| | | | | 356/436 |
| 2009/0059218 A1 | * | 3/2009 | Harner | G01N 21/4785 |
| | | | | 356/243.2 |
| 2014/0346364 A1 | | 11/2014 | Lawal et al. | |

FOREIGN PATENT DOCUMENTS

| | | |
|---|---|---|
| CN | 108426835 A | 8/2018 |
| WO | WO 03/067228 A1 | 8/2003 |
| WO | WO 2017/051424 A1 | 3/2017 |

OTHER PUBLICATIONS

European Patent Office, International Search Report in International Patent Application No. PCT/EP2020/068055, 3 pp. (Sep. 21, 2020).
European Patent Office, Written Opinion in International Patent Application No. PCT/EP2020/068055, 6 pp. (Sep. 21, 2020).

\* cited by examiner

SELF-CALIBRATING OPTICAL TURBIDITY MEASURING APPARATUS

CROSS-REFERENCE TO RELATED APPLICATIONS

This patent application claims priority to European Patent Application Ser. No. EP19183582.6, filed on Jul. 1, 2019, and to International Patent application No. PCT/EP2020/068055, filed on Jun. 26, 2020, both of which are incorporated herein by reference for all purposes.

FIELD OF THE DISCLOSURE

The present disclosure relates to optical turbidity measurement and, more particularly, to a self-calibrating optical turbidity measuring apparatus, a method for self-calibrating the optical absorption measuring apparatus, a use, a computer program, and a computer-readable storage medium.

BACKGROUND OF THE DISCLOSURE

Turbidity is a measure of cloudiness, haziness, absorbance, or amount of scattering of an optical beam applied through or across a liquid medium. Turbidity of a medium may be caused by large numbers of individual particles that stray light within the medium. Turbidity may be measured, e.g., in values of "Formazine Turbidity Units (FTU)" or in "Nephelometric Turbidity Units (NTU)". For a turbidity measurement, optical turbidity measuring apparatuses, which use a light sensor, are used. At least some types of turbidity measuring apparatuses require regular calibration of the light sensor. In addition, at least some types of turbidity measuring apparatuses use Formazine (in an aqueous solution or suspension) as a standard for turbidity calibrations. However, using Formazine has some drawbacks. Formazine is inherently unstable and may drop out of a solution quickly. Furthermore, the rate, at which the Formazine solution is stirred, may affect the value measured.

BRIEF SUMMARY OF THE DISCLOSURE

There may be a desire for an improved turbidity measuring apparatus.

This task is solved by the subject-matter of the claims. Further embodiments are set forth in the dependent claims and the following description.

According to a first aspect, a self-calibrating optical turbidity measuring apparatus for measuring a turbidity of a medium, the apparatus comprises:
- a housing comprising a cavity;
- an optical standard, which is moveable between a first section and a second section within the cavity; and
- a light source and a light sensor, arranged at the first section and configured to measure the turbidity of the medium, when the optical standard is at the second section, and
- configured to measure the turbidity of the optical standard and to determine, as a function of the measured turbidity, a calibration coefficient for performing a self-calibration, when the optical standard is at the first section.

An optical turbidity measuring apparatus may measure the scattered light of a medium, for instance, in an angle of 90° from the direction of the light source (for FTU and NTU values). Some turbidity measuring apparatus may measure the through light, i.e., in a 0° angle, e.g., for measuring "Formazine Attenuation Units (FAU)." A self-calibrating apparatus is an apparatus that is able and/or configured to perform turbidity calibration automatically, e.g., by changing relevant values of the measuring apparatus, e.g., according to a calibration instrument, calibration standard, calibration means, and the like. A medium may be a fluid or a solid, e.g., a fine-grained solid.

The housing of the apparatus may be formed in any shape. The material of the housing may depend on the media to be measured. The housing comprises a cavity. The cavity and/or the housing may sometimes be called turbidity flow cell.

The optical turbidity measuring apparatus comprises an optical standard, which is moveable between a first section and a second section within the cavity. The optical standard may provide the scattering medium required for the calibration. The optical standard may be a solid, which may result in a benefit for some aspects its handling. The optical standard may be a fluid, e.g., a liquid or a gel. The fluid may be held in a cage or be treated without a cage. When the optical standard is a solid (and/or caged), the moving may be performed via a piston connected to the solid optical standard. The moving may be done manually or by a motor. When the optical standard is a fluid, this may be placed in a separate compartment that the liquid standard or the gel. The moving, then, may be performed by using a pump, a combination of valves and actuators (to remove the sample or the medium from the light path of the sensor, and place the turbidity standard in place) or the like. When the optical standard is a caged fluid, the moving of the cage with the fluid may be done in a similar way than moving the solid optical standard.

The optical standard is moveable between a first section and a second section within the cavity. The second section may be formed as a kind of "home place" for the optical standard. The optical standard may be stored in the second section during turbidity measurement of the medium. There may be structures to separate the first section from the second section during turbidity measurement of the medium. At least for some embodiments of the optical standard, it may be advantageous for the optical standard not to come into contact with the medium. For instance, a solid optical standard may change its optical (and/or other) properties when moistened by a liquid medium.

The optical turbidity measuring apparatus further comprises a light source and a light sensor for the turbidity measurement. The light source or light emitter for the turbidity measurement may be a LED (e.g., an IR-LED, infrared light-emitting diode, with a wavelength, e.g., of about 860 nm), a laser diode, a flash lamp, etc. The light sensor may be an optical receiver for the turbidity measurement. In the optical turbidity measuring apparatus, there may be more than one of each the light source and/or the light sensor. Both the light source and the light sensor are arranged at the first section. The light sensor (or light sensors) may be located at 0° (i.e., at opposite positions) and/or at 90° and/or at other predefined angles in relation to the direction of the light source (or light sources). The light source and the light sensor are configured to measure the turbidity of the materials placed between them. When the optical standard is at the second section—and the medium is placed between the light source and the light sensor—the turbidity of the medium may be measured. When the optical standard is at the first section, the turbidity of the optical standard may be measured. When measuring and/or having measured the turbidity of the optical standard, a calibration coefficient of the optical standard may be determined. The calibration coefficient may be determined as a function of the measured turbidity, e.g., by comparing the "old" measured turbidity of the optical standard with the newly measured one. This new, updated and/or corrected calibration coefficient may, then, be fed into the evaluation path of the light sensor, thus performing a self-calibration.

This apparatus brings many benefits. Every time the self-calibration is performed and the result is used for recalibrating the sensor (and/or evaluation modules connected to the sensor), a correction for disturbing effects like sensor drifts, temperature drift, pollution of the optical elements and/or other effects is achieved. The handling is generally improved by this self-calibration. Thus, the amount of time that a user has to spend for calibrating the instrument may be reduced. By providing means for a self-calibration, most measurements can be performed remotely, thus reducing the need of having a person on-site when the measurement is performed. The reliably and the precision of the measurement is improved, because self-calibration may be performed easily—and possibly more often—than with a necessity of on-site calibration by specialized personnel.

In various embodiments, the cavity comprises an inner wall, wherein the inner wall comprises an essentially straight section in the area of a first end of the cavity, wherein the essentially straight section comprises the first section and the second section, wherein the second section is distinct from the first section and is closer to the first end of the cavity than the first section; and/or the cavity comprises an opening in the area of a second end of the cavity, wherein the opening is configured to open the cavity for the medium.

The housing comprises a cavity with an inner wall. The cavity may be formed in any shape, but it comprises an essentially straight section, i.e., in at least this essentially straight section, the inner walls are essentially parallel to a middle axis. The essentially straight section is located in the area of a first end of the cavity. At an area of a second end of the cavity, an opening is located. The area of the second end and the opening may be of any shape. The opening may or may not be connected to a tube. The opening is a kind of a flow cell inlet/outlet, which is configured to open the cavity for the medium, i.e., to provide an entrance for the medium in for the turbidity measurement of the medium. The opening may always be open or may be opened temporarily for the measuring.

The optical turbidity measuring apparatus comprises an optical standard, which is moveable between a first section and a second section within the essentially straight section in the cavity.

The optical standard is moveable between a first section and a second section in the cavity. Both sections are distinct from each other and are located within the essentially straight section cavity. The second section is closer to the first end of the cavity than the first section. The optical standard may be stored in the second section during turbidity measurement of the medium. There may be structures to separate the first section from the second section during turbidity measurement of the medium. At least for some embodiments of the optical standard, it may be advantageous for the optical standard not to come into contact with the medium. For instance, a solid optical standard may change its optical (and/or other) properties when moistened by a liquid medium.

In various embodiments, the turbidity measuring apparatus further comprises a separator configured to separate the optical standard from the medium, when the optical standard is at the second section.

This may contribute to a longer lifetime and/or better or more reliable of the optical standard, because many types if optical standards may suffer from having contact with the medium, e.g., by being moistened by it. This may further reduce the need of cleaning the optical standard and/or the cavity.

In various embodiments, the separator provides a seal between the first section and the second section and/or comprises a sealing ring attached to a bottom of the optical standard, and/or the separator comprises lamellae like a camera aperture.

The seal may be formed as an O-ring seal, with lamellae like a camera aperture, and/or other solutions. The seal may be attached to the bottom of the optical standard, which may be tightly or loosely coupled or may be detachably connected to the bottom. This may have the further effect of cleaning at least parts of the inner wall of the apparatus.

In various embodiments, the measuring apparatus further comprises a lip or a brush. The lip or brush is attached to the optical standard, wherein the lip or brush is configured to clean the first section. This may be implemented instead of additionally to the seal, particularly the seal at the optical standard's bottom.

At least for several types of flow cells, fouling may raise measurement problems. Fouling may occur, e.g., on the flow cell walls and optical windows. This may affect the turbidity reading and may mean that the flow cell needs cleaning and/or recalibration. Since this kind of cleaning is performed at least each time when the self-calibration is done, this is not time-consuming. Since fouling is an often-appearing issue in turbidity measuring apparatuses, particularly when measuring liquids, a cleaning means such as a lip or brush may further improve the handling and may reduce the number of errors, e.g., caused by a polluted light sensor, and/or may prolong the maintenance intervals of the apparatus.

In various embodiments, the optical standard comprises or consists of a solid, a fluid, and/or a gel.

In an embodiment, the optical standard comprises or consists of a solid calibration standard. This brings the benefit to avoid the drawbacks and harmful effects of using Formazine.

In an embodiment, the solid calibration standard is measured at various angles during calibration. This may be performed by turning the solid calibration standard and/or by providing a plurality of light sources and/or light sensor, in some embodiments corresponding light sensors. This advantageously may contribute to take into account non-linearities of the solid calibration standard.

In an embodiment, the essentially straight section is of a round, elliptic, and/or polygonal cross section, and/or the optical standard is of a round, elliptic, and/or polygonal cross section. The form of the straight section and the optical standard (as a solid or its cage) may—in wide ranges—be similar or different.

In various embodiments, the inner wall of the cavity comprises a conical section or is essentially of a conical form. In this sense, the opening or opening portion may not be part of the cavity. In some embodiments, the conical section may span over the biggest of the inner wall, for instance over more than 60%, more than 80%, or more than 90%. This may contribute to minimize building-up of fouling on this face, for example caused by suspended solids and/or sand that may be present in the sample.

In various embodiments, the measuring apparatus further comprising a cleaning apparatus within the cavity. This may prolong the maintenance intervals, because, e.g., the fouling effect may be reduced this way.

In various embodiments, to measure the turbidity of the optical standard comprises to measure at a plurality of points in time. The plurality of points in time may comprise to measure at more than two, more than five, or more than ten points in time. For the sake of an example, the measuring apparatus may initially perform an automatic calibration every hour, and obtain a drift of 0.1 NTU/hour, e.g., caused by fouling. The measuring apparatus could then reduce the automatic calibration frequency to advantageously cope with a drift of the measuring apparatus, reduce wear on the motor system, and/or to extend the life of the measuring apparatus, while still being aware of the affect this has on the measuring apparatus drift.

In embodiments, where the measuring apparatus further comprises a lip or a brush for cleaning and/or reducing the fouling effect, the plurality of points in time may, e.g., comprise to clean once per hour and may lead to calibration results like shown below, in Table 1:

TABLE 1

| Day 1 | Day 2 | Day 3 | Day 4 | Day 5 | Day 6 | Day 7 |
|---|---|---|---|---|---|---|
| 100 NTU | 99 NTU | 98 NTU | 97 NTU | 96 NTU | 95 NTU | 94 NTU |

This data may be used in the following way: The drift of the measuring apparatus may be calculated, based on this plurality of points in time. The user may input a maximum drift into the sensor, and, based on this predefined and/or readjusted value, measuring apparatus may extrapolate a drift rate to present a length of time, for instance until the maximum drift has been broken. This would then, for example, trigger an alarm and/or raise another action. Thus, the measuring apparatus may determine that the drift is 1 NTU/day at a cleaning frequency of once/hour. The measuring apparatus may then, e.g., automatically change the frequency to 10 times/hour and obtain the following data, as shown in Table 2:

TABLE 2

| Day 1 | Day 2 | Day 3 | Day 4 | Day 5 | Day 6 | Day 7 |
|---|---|---|---|---|---|---|
| 100 NTU | 100 NTU | 100 NTU | 100 NTU | 100 NTU | 100 NTU | 100 NTU |

Based on this, the measuring apparatus may determine that at 10 times/day there is no drift, so it could reduce the cleaning frequency to 2 times/hour and obtain the following data, as shown in Table 3:

TABLE 3

| Day 1 | Day 2 | Day 3 | Day 4 | Day 5 | Day 6 | Day 7 |
|---|---|---|---|---|---|---|
| 100 NTU | 99.9 NTU | 99.8 NTU | 99.7 NTU | 99.6 NTU | 99.5 NTU | 99.4 NTU |

This example may show a way to cope with "fouling levels", i.e., to make the measuring apparatus automatically change the cleaning frequency, and to provide the measuring apparatus with enough data to make a decision on the trade-off between drift due to fouling, and lifetime of the wipers (or other cleaning instruments), without the user needing to understand their process and configure the parameter. This may increase the time within which precise measurements, i.e., within a predefined tolerance level, can be made.

The measuring at a plurality of points in time may further be used for an automatic update of calibration coefficients. If, for instance, the measuring apparatus is configured to automatically update the calibration coefficients, a "smoothing algorithm" may be useful to smooth out any outliers in the calibration. This "smoothing algorithm" may comprise a formula:

New calibration slope=$a$*old calibration slope+(1-$a$)*slope from last calibration Wherein the value of "a" may be determined in development in order to provide suitable smoothing. Additionally, or as an alternative, other and/or more complex algorithms that ignore outliers based on the standard deviation of the results may be applied.

In various embodiments, the measuring apparatus further comprises a motor. The optical standard is connected to the motor, which is configured to move the optical standard parallel to a middle axis of the essentially straight section. The moving may be achieved, e.g., by using a piston or the like, which is connected to the optical standard. The motor may be an electric motor, it may be a linear motor and/or it may move the optical standard and/or the piston directly or via a gear, e.g., via a gear that acts like a screw and/or other implementations of a gear. Using the motor further increases the degree of automatism of the turbidity measuring apparatus and may further decrease the amount of time to be spent for calibration and/or for manual parts of the calibration process.

In an embodiment, the inner wall comprises a further section of, which is distinct from the essentially straight section and which has a conical form. This may be advantageous for some sort of media and/or to its connecting passages.

A further aspect comprises a method for self-calibrating an optical turbidity measuring apparatus, the method comprising:
  providing a moveable optical standard at a first section of a cavity within a housing of the apparatus,
  wherein a light source and a light sensor are arranged at the first section;
  measuring, by means of the light source and the light sensor, a turbidity of the optical standard;
  determining, as a function of the measured turbidity, a calibration coefficient;
  performing a self-calibration by using the determined calibration coefficient as a new calibration coefficient;

moving the optical standard to a second section within the essentially straight section,
wherein the second section is distinct from the first section and is closer to a first end of the cavity than the first section;
providing a medium at the first section; and
measuring, by means of the light source and the light sensor and by using the new calibration coefficient, the turbidity of the medium, while the optical standard is at the second section.

In an embodiment, the method further comprises the steps of:
when the determined calibration coefficient exceeds a predefined limit, sending an alarm; or
when the determined calibration coefficient is within the predefined limit, continue measuring.

The user may set a limit for a predefined limit, e.g., as an absolute values and/or for the tolerable calibration drift. When the determined calibration coefficient exceeds this predefined limit, an alarm may be raised or sent, e.g., for notifying the user (e.g., "instrument is out of spec"), for starting diagnostic means, for initiating a cleaning, and/or other predefined actions. Furthermore, the user may then recalibrate the instrument and/or start a self-calibration and/or further calibration.

In an embodiment, the method further comprises the step of:
closing and/or moving a sealing means,
wherein the separator comprises a seal between the first section and the second section and/or a seal attached to a bottom of the optical standard.

A further aspect comprises a use of a self-calibrating optical turbidity measuring apparatus as described above and/or below and/or the method as described above and/or below for measuring a turbidity or an absorption of a medium, wherein the medium comprises a fluid and/or a solid, and/or for an optical measurement of a water quality. The measurement of water quality may comprise to measure cloudiness, haziness, absorbance, or amount of scattering of an optical beam applied through and/or across a liquid medium.

The self-calibrating optical turbidity measuring apparatus may support measurements within a wide range of turbidity values, e.g., for a Nephelometric Turbidity Unit, NTU, for instance between 0.016 and 200,000.

A further aspect comprises a computer program product comprising instructions, which, when the program is executed by a processor of a turbidity measuring apparatus, cause the apparatus to carry out the method as described above and/or below.

A further aspect comprises a computer-readable storage medium where a computer program as described above is stored on.

BRIEF DESCRIPTION OF THE SEVERAL VIEWS OF THE DRAWING(S)

DETAILED DESCRIPTION OF EXEMPLARY EMBODIMENTS

Figure 1:
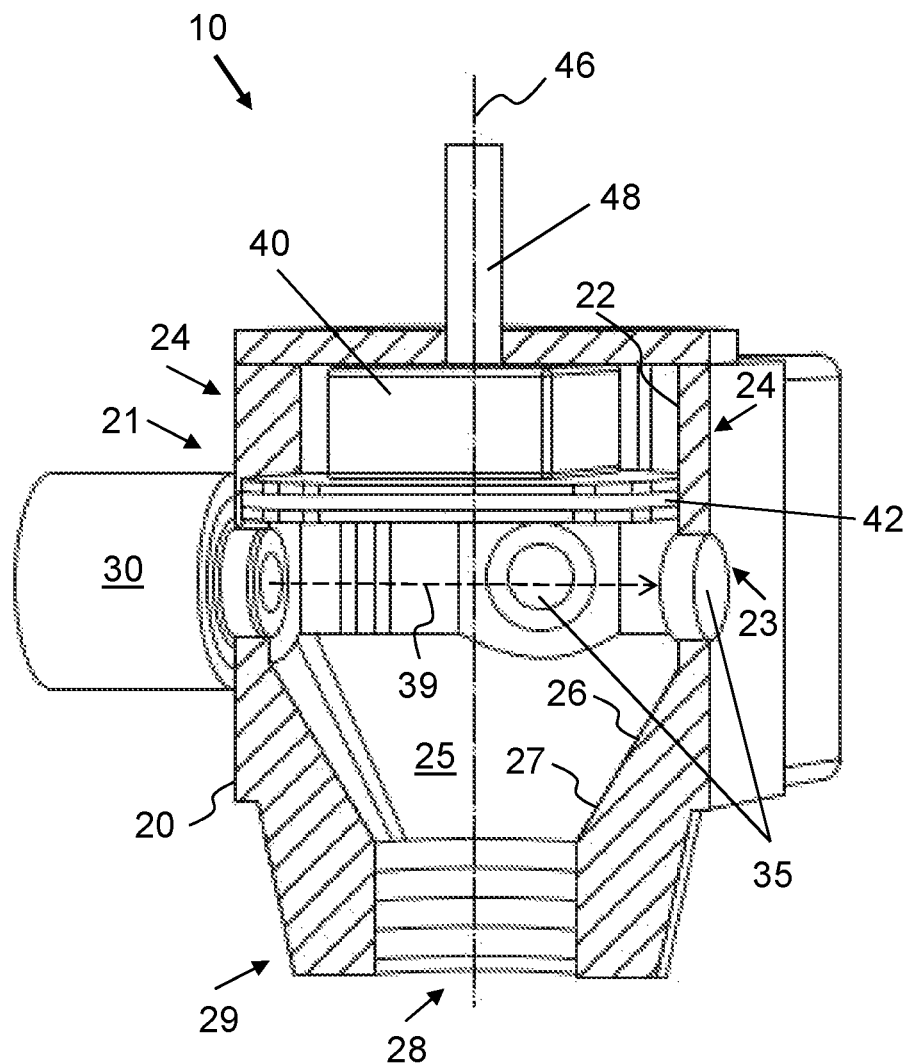
FIG. 1 depicts schematically a self-calibrating optical turbidity measuring apparatus according to an embodiment of the present disclosure.

In FIG. 1, a self-calibrating optical turbidity measuring apparatus 10 according to an embodiment of the present disclosure is depicted schematically. The apparatus 10 comprises a housing 20 with a cavity 25. The lower part 27 of an inner wall 26 of the cavity 25 is formed conically, with an opening 28 in the area of a second end 29 of the cavity 25. The opening 28 is configured to open the cavity 25 for a medium to be measured, for instance by pumping the medium into the cavity 25. The upper part of the cavity 25, i.e., in the area of a first end 21 of the cavity 25, is a section 22 of the inner wall 26, which is formed essentially straight. The essentially straight section 22 comprises a first (in this figure: lower) section 23 and a second (upper) section 24. An optical standard 40 is shown in a position within the second (upper) section 24. The second section 24 is separated from the first section 23 by an O-ring seal 42. In this position of the optical standard 40, a turbidity measurement of the medium may be performed. For this purpose, the medium is places and/or pumped into the area of a light-beam 39 between a light source 30 and a light sensor 35. The light source 30 may be an IR-LED, with a wavelength of, e.g., 860 nm. In this embodiment, two light sensors 35 are depicted, one in a 0° position and the other one in a 90° position in relation to the light-beam 39.

For a self-calibration, the optical standard 40 may be moved—of course, after having removed the medium from the cavity 25—from the second section 24 to the first section 23. This may be performed by shifting the optical standard 40 by means of a piston 48 manually or by a motor. When placed in the first section 23, the turbidity of the optical standard 40 may be measured by means of light source 30 and light sensor 35. As a result, a calibration coefficient may be determined. This may be used to update the steering values (e.g., the amplification) of the turbidity measuring apparatus 10.

Figure 2:
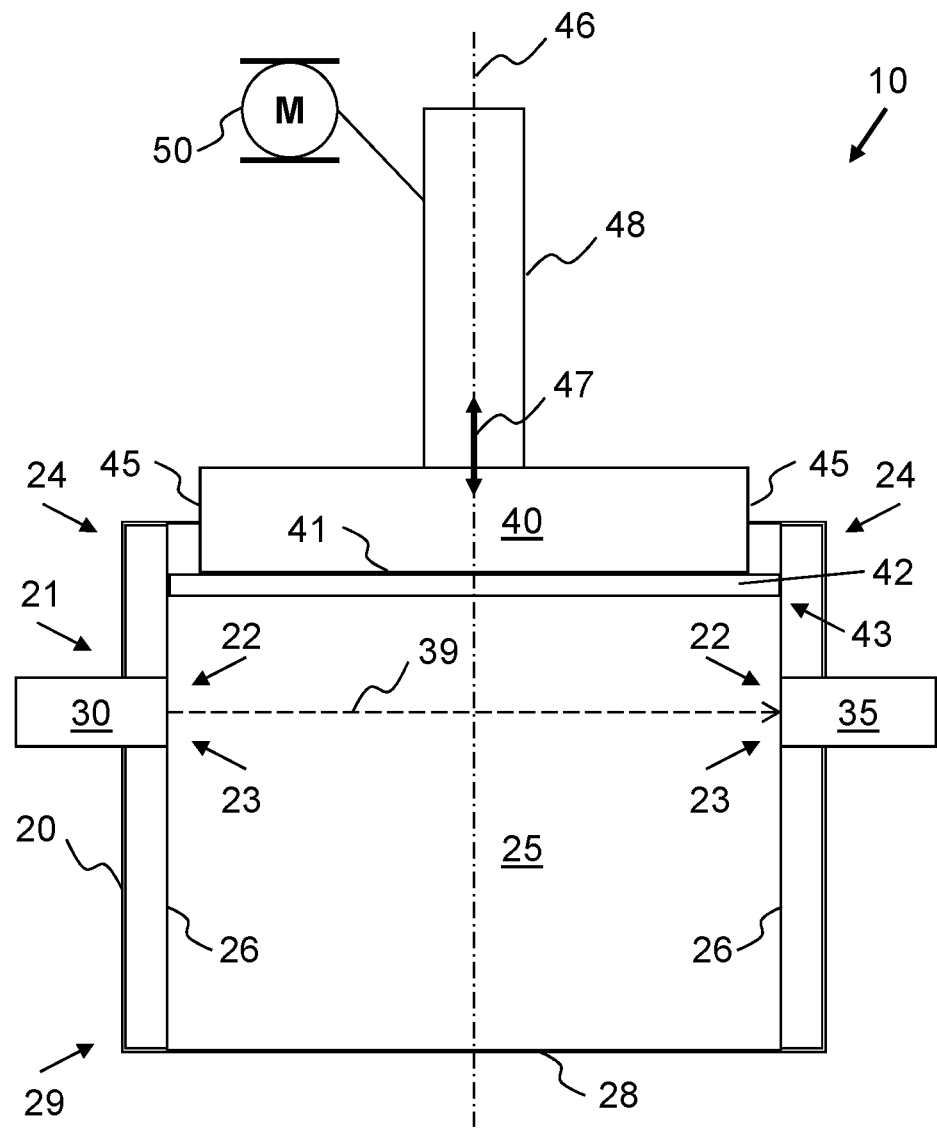
FIG. 2 depicts schematically a self-calibrating optical turbidity measuring apparatus according to a further embodiment of the present disclosure.

FIG. 2 depicts schematically a self-calibrating optical turbidity measuring apparatus 10 according to a further embodiment. Same reference signs as in FIG. 1 indicate the same elements. The optical standard 40 may be formed as a cylinder, with cylindrical sections or sidewalls 45. The optical standard 40 may be moved by a piston 48, parallel to a middle axis 46, from its position in the second section 24 to the first section 23, and also back; see arrow 47. The piston 48 may be moved by a motor 50, e.g., by an electric motor.

The separator 42 is formed as a lip. The lip may be used, e.g., along with a brush, for cleaning the essentially straight section 22, at least with every self-calibration. This may improve the quality of the measurement results by removing potential fouling form the optical components. The brush may be, alternatively or additionally, be implemented as a separate tool. Different to FIG. 1, the lower part, including opening 28, is formed as a cylinder. This may ease the inlet of some sorts of media.

Figure 3:
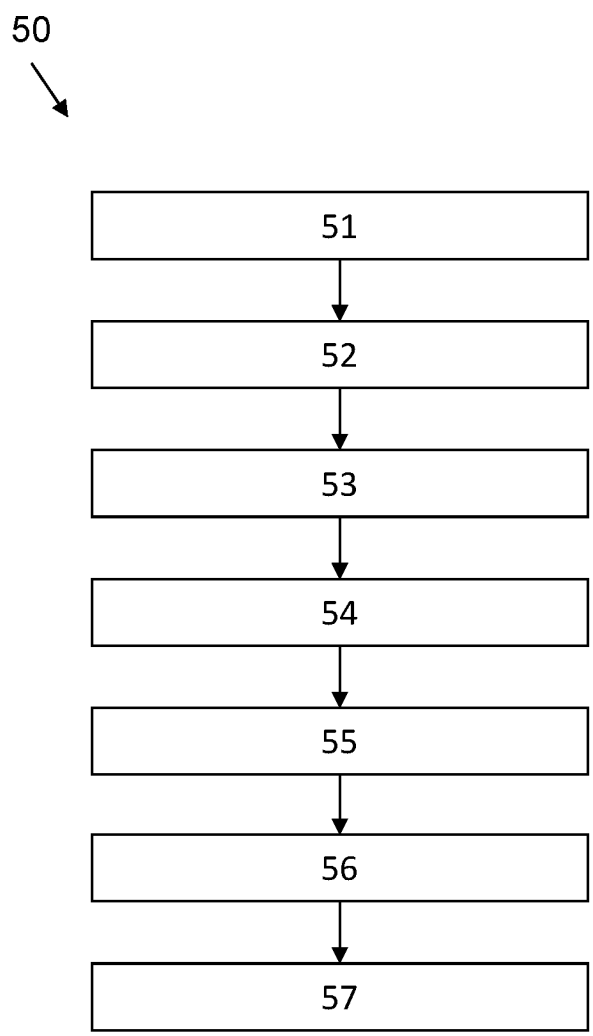
FIG. 3 depicts schematically a method according to an embodiment of the present disclosure.

FIG. 3 depicts schematically a flow diagram 50 of a method according to an embodiment. In a step 51, an optical standard 40 (cf. FIG. 1 or 2) is moved to a first section 23 of an essentially straight section 22 at an inner wall 26 within a housing 20 of the apparatus 10. A light source 30 and a light sensor 35 are arranged at this first section 23. In a step 52, a turbidity of the optical standard 40 is measured, by means of the light source 30 and the light sensor 35. In a step 53, a calibration coefficient, as a function of the measured turbidity, is determined. In a step 54, the determined calibration coefficient as a new calibration coefficient is used, thus performing a self-calibration, e.g., by recalibrating the light sensor 35, by using the determined calibration coefficient as a new calibration coefficient. In a step 55, the optical standard 40 is moved to a second section 24 within the essentially straight section 22, wherein the second section 24 is distinct from the first section 23 and is closer to a first end 21 of the cavity 25 than the first section 23. In a step 56, the cavity 25 is opened for the medium, to bring the medium to the first section 23. In a step 57, by means of the light source 30 and the light sensor 35 and by using the new calibration coefficient, the turbidity of the medium is measured, while the optical standard 40 is at the second section 24.

LIST OF REFERENCE SIGNS 10 optical turbidity measuring apparatus
20 housing
21 first end
22 straight section
23 first section
24 second section
25 cavity
26 inner wall
27 conical section
28 opening
29 second end
30 light source
35 light sensor
39 light beam
40 optical standard
41 bottom of the optical standard
42 separator
43 lip or brush
45 sidewalls
46 middle axis
47 arrow
48 piston
49 shaft
50 flow chart
51-57 steps All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A self-calibrating optical turbidity measuring apparatus for measuring a turbidity of a medium, the apparatus comprising:
    a housing comprising a cavity, wherein the cavity comprises an inner wall, wherein the inner wall of the cavity comprises a conical section or is of a conical form, with an opening in an area of a second end of the cavity, the second end arranged on a bottom of the cavity,
    an optical standard, which is moveable between a first section and a second section within the cavity, and
    a light source and a light sensor, arranged at the first section and
    configured to measure the turbidity of the medium, when the optical standard is at the second section, and
    configured to measure the turbidity of the optical standard and to determine, as a function of the measured turbidity, a calibration coefficient for performing a self-calibration, when the optical standard is at the first section.

2. The turbidity measuring apparatus of claim 1,
    wherein the inner wall comprises an essentially straight section in the area of a first end of the cavity,
    wherein the essentially straight section comprises the first section and the second section, wherein the second section is distinct from the first section and is closer to the first end of the cavity than the first section; and/or
wherein the opening is configured to open the cavity for the medium.

3. The turbidity measuring apparatus of claim 1, further comprising:
    a separator configured to separate the optical standard from the medium, when the optical standard is at the second section,
    wherein the separator provides a seal between the first section and the second section, the seal comprising at least one of a sealing ring attached to a bottom of the optical standard, and lamellae like a camera aperture.

4. The turbidity measuring apparatus of claim 1, further comprising a lip or a brush, wherein the lip or the brush is attached to the optical standard, and wherein the lip or brush is configured to clean the first section.

5. The turbidity measuring apparatus of claim 1, wherein the optical standard comprises a solid, a fluid, and/or a gel material.

6. The turbidity measuring apparatus of claim 1, further comprising a cleaning apparatus within the cavity.

7. The turbidity measuring apparatus of claim 1, wherein the light source and the light sensor are further configured to measure the turbidity of the optical standard at a plurality of points in time.

8. The turbidity measuring apparatus of claim 1, further comprising a motor, wherein the optical standard is connected to the motor, which motor is configured to move the optical standard along a direction that is parallel to a middle axis of the essentially straight section.

9. A method for self-calibrating an optical turbidity measuring apparatus, the method comprising:
   providing a moveable optical standard at a first section of a cavity within a housing of the apparatus, wherein the cavity comprises an inner wall, wherein the inner wall of the cavity comprises a conical section or is of a conical form, with an opening in the area of a second end of the cavity, the second end arranged on a bottom of the cavity, wherein a light source and a light sensor are arranged at the first section of the cavity;
   measuring, using the light source and the light sensor, a turbidity of the optical standard;
   determining, as a function of the measured turbidity, a calibration coefficient;
   performing a self-calibration by using the determined calibration coefficient as a new calibration coefficient;
   moving the optical standard to a second section within the cavity, wherein the second section is distinct from the first section and is closer to a first end of the cavity than the first section;
   providing a medium at the first section; and
   measuring, using the light source and the light sensor, and by using the new calibration coefficient, the turbidity of the medium.

10. The method of claim 9, further comprising the steps of:
   when the determined calibration coefficient exceeds a predefined limit, sending an alarm; or
   when the determined calibration coefficient is within the predefined limit, continue measuring.

11. The method of claim 9, wherein measuring the turbidity of the optical standard comprises measuring at a plurality of points in time.

12. A computer program product comprising computer executable instructions existing in a tangible medium, the tangible medium being associated with a self-calibrating optical turbidity measuring apparatus for measuring a turbidity of a medium, the apparatus comprising:
   a housing comprising a cavity, wherein the cavity comprises an inner wall, wherein the inner wall of the cavity comprises a conical section or is of a conical form, with an opening in an area of a second end of the cavity, the second end arranged on a bottom of the cavity,
   an optical standard, which is moveable between a first section and a second section within the cavity, and
   a light source and a light sensor, arranged at the first section and
   configured to measure the turbidity of the medium, when the optical standard is at the second section, and
   configured to measure the turbidity of the optical standard and to determine, as a function of the measured turbidity, a calibration coefficient for performing a self-calibration, when the optical standard is at the first section;
   wherein the computer executable instructions are executed to:
      cause the optical standard to move from the second section to the first section of the cavity;
      measure, using the light source and the light sensor, a turbidity of the optical standard;
      determine, as a function of the measured turbidity, a calibration coefficient;
      perform a self-calibration by using the determined calibration coefficient as a new calibration coefficient;
      move the optical standard to the second section within the essentially straight section, wherein the second section is distinct from the first section and is closer to a first end of the cavity than the first section;
      provide a medium at the first section; and
      measure, using the light source and the light sensor, and by using the new calibration coefficient, the turbidity of the medium.

* * * * *